(12) United States Patent
Merant

(10) Patent No.: US 6,990,794 B2
(45) Date of Patent: Jan. 31, 2006

(54) CONVEYOR MEANS FOR A FRUIT HARVESTER

(75) Inventor: Jean Camille Merant, La Chapelle-Hermier (FR)

(73) Assignee: CNH France S.A., Racine, WI (US)

(*) Notice: Subject to any disclaimer, the term of this patent is extended or adjusted under 35 U.S.C. 154(b) by 120 days.

(21) Appl. No.: 10/381,298

(22) PCT Filed: Sep. 28, 2001

(86) PCT No.: PCT/EP01/11318

§ 371 (c)(1),
(2), (4) Date: Oct. 20, 2003

(87) PCT Pub. No.: WO02/28166

PCT Pub. Date: Apr. 11, 2002

(65) Prior Publication Data

US 2004/0074218 A1 Apr. 22, 2004

(30) Foreign Application Priority Data

Oct. 2, 2000 (EP) .......................................... 00402702

(51) Int. Cl.
*A01D 46/00* (2006.01)

(52) U.S. Cl. .................................................... 56/328.1
(58) Field of Classification Search ................ 56/327.1, 56/328.1, 330, 331, 340.1
See application file for complete search history.

(56) References Cited

FOREIGN PATENT DOCUMENTS

| EP | 0 893 049 | 1/1999 |
|---|---|---|
| FR | 2 298 266 | 8/1976 |
| FR | 2 589 371 | 7/1987 |

*Primary Examiner*—Robert E Pezzuto
(74) *Attorney, Agent, or Firm*—Rebecca Henkel; Brant T. Maurer

(57) ABSTRACT

A fruit harvesting machine comprises a movable frame and a harvesting assembly for detaching crop material, comprising fruit and foliage from trees, shrubs and the like standing on a field. A conveyor receives the detached fruit and foliage, together with juice from the fruit, and transports the same to a container. A stationary screen is installed above the conveyor for retaining thereon solid fruit portions and for allowing passage therethrough of the juice. A cleaning device mechanism is provided above the screen for separating the foliage from the detached fruit. The conveyor is provided with outwardly extending fingers extending through the screen for engaging and moving the solid fruit portions to the container.

68 Claims, 3 Drawing Sheets

CONVEYOR MEANS FOR A FRUIT HARVESTER

FIELD OF INVENTION

The present invention relates to machines for harvesting fruit grown on trees or shrubs, such as grapes, berries, coffee beans, olives and the like. More particularly it relates to apparatus for conveying the crop material which has been detached by the harvesting unit from the trees or shrubs to a container.

BACKGROUND OF INVENTION

Fruit harvesting machines such as grape harvesters machines commonly are equipped with a shaker assembly which straddles a row of shrubs or vines. The shaker assembly comprises sets of shaker rods which are oscillated to beat or shake the vines vigorously to detach the grapes or bunches of grapes from the vine shrubs. The detached fruit is guided into conveyors on both sides of the vines and conveyed by these conveyors to bins or containers on top of the grape harvester. When the machines reaches the end of a vine row, the bins may be unloaded into a towed cart for further transport to the winery.

The action of the shaker rods on the vines will also detach some foliage therefrom. These leaves are equally received in the conveyors and may get mixed up with the grapes in the bins. Conventionally the harvesting machine is equipped with cleaning mechanism for separating the leaves and other foreign material such as detached wood from the fruit. For example the New Holland Braud grape harvester model SB64 has below the upper run of each conveyor an intermediate apron conveyor for receiving the detached fruit and tipping the same into the bins on each side of the harvester. Over the discharge end of the apron a cleaning fan is installed for extraction of the leaves from the crop material on the apron. The cleaning action is enhanced by the air stream acting on the falling crop.

It has been observed that the fan not only sucks away the foliage, but also drops of valuable fruit juice. The fruit juice results from grape berries which have burst under the impact of the shaker rods. At the discharge end of the intermediate conveyor the air flow sucks away the juice drops and deposits them together with the leaves aside the machine. These losses can be reduced by decreasing the fan speed in order to diminish air speeds, but such action inevitably also reduces the amount of foreign material which is removed from the crop.

FR-A-2.686.530 proposes to provide the fruit harvester with a cleaning system comprising inwardly extending rods retaining the leaves, a mesh funnel installed beneath the rods retaining the grape bunches and the berries, and a full plate funnel receiving the fruit juice which migrated between the rods and through the mesh funnel. Such system is voluminous in size and prone to pollution by crop material sticking to the inner or outer funnels. Furthermore there is no easy access for cleaning the polluted components.

FR-A-2.298.266 discloses a conveyor and cleaning system including conveyor cups or buckets which are provided with transverse ribs for retaining thereon the leaves. Loose grapes and juice are received in tub sections below or between the ribs. The buckets are provided with air inlets on their sides for allowing an effective upward air stream removing the leaves from the ribs. Such arrangement drastically reduces the conveying capacity of the buckets. Furthermore the lower section of the buckets is partially closed such that crop and other material can easily accumulate therein, while access for cleaning is seriously hindered.

SUMMARY OF INVENTION

It is an object of the present invention to remedy to the problems indicated above and to provide an improved conveyor and cleaning arrangement which is capable of reducing the losses of fruit juice while being less susceptible to the accumulation of material thereon.

According to the present invention there is provided a fruit harvesting machine, comprising: a frame equipped with mechanism for travelling the frame over a field; a harvesting assembly for detaching crop material, comprising fruit and foliage from trees, shrubs and the like standing on said field; a conveyor mechanism for receiving said detached fruit and foliage, together with juice from said fruit, and transporting the same either directly or indirectly to a container; a screen mechanism for retaining thereon solid fruit portions and for allowing passage therethrough of said juice; and a cleaning mechanism installed above said conveyor mechanism for separating said foliage from said detached fruit; characterised in that: said screen mechanism is positioned at a fixed location above said conveyor mechanism and below said cleaning mechanism; and said conveyor mechanism is provided with tine mechanism extending through said screen mechanism for engaging and moving said solid fruit portions to said container.

These tine mechanism assure the positive transport of the crop material along the screen. The tine mechanism preferably are affixed to flexible, endless drive mechanism which move the tines along a closed loop path.

In a preferred embodiment, the conveyor mechanism comprises an apron to which is affixed an array of outwardly extending fingers. In this manner no separate mechanism have to be provided for advancing the fingers through the screen. Juice and small crop portions, such as loose berries, are received on the apron surface below the screen. They may be held back by the solid base portion of transverse ridges from which the fingers project upwardly. The upper, crop receiving run may be inclined upwardly, e.g. at 15°, in its normal conveying direction to optimise the trajectory of the crop material at the downstream end of the conveyor. The ridges the may be curved to concentrate crop and juice near the middle of the apron.

Preferably the screen extends substantially parallel to the conveyor mechanism. Advantageously it comprises an array of parallel bars extending in the transport direction of the conveyor. The fingers may be dimensioned to act as scrapers along the bars to prevent the accumulation of crop material below and on the sides of the bar. The height of the solid base portion of the ridge may be chosen to provide additional support for the bars.

In order to provide sufficient free space for the crop on the apron to be discharged from the conveyor, the bars may be mounted in a cantilever fashion, with their free ends adjacent the downstream end of the conveyor. Each bar may be mounted to a separate bar mount, providing space in between for the passage of the fingers. The bar mounts can be detachably mounted to a common support plate, for easy replacement of worn or damaged bars.

Preferably the bars are made of corrosion resistant material, e.g. stainless steel or composite material.

A fruit harvesting machine in accordance with the present invention will now be described in greater detail, by way of example, with reference to the accompanying drawings, in which:

DETAILED DESCRIPTION OF THE PREFERRED EMBODIMENT

In the following description "right hand" and "left hand" references are determined by standing at the rear of the harvester and facing in the direction of normal forward travel. It is also to be understood that, throughout this description, terms such as "forward", "rearward", "upward", "downward", etc. are words of convenience and are not to be construed as limiting terms.

Figure 1:
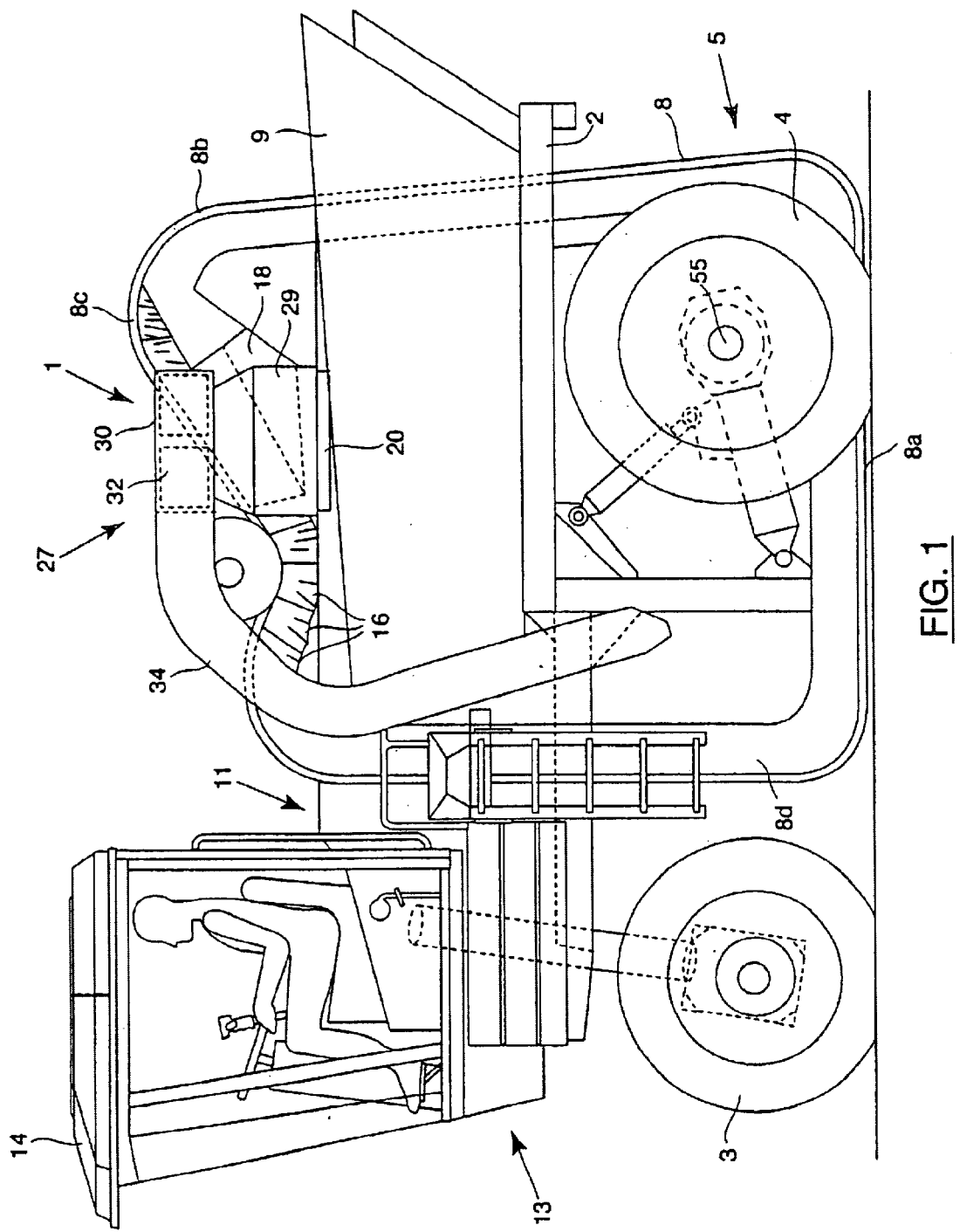
FIG. 1 is a side elevational view of a harvesting machine fitted with a bucket conveyor, an intermediate apron conveyor and a cleaning fan installed over said intermediate conveyor.

The fruit harvesting machine shown in FIG. 1 is a grape harvester, generally indicated by reference numeral 1 and comprising a chassis or main frame 2, provided with front steerable wheels 3 and rear wheels 4. Both the front wheels 3 and the rear wheels 4 are driven for moving the frame 2 over the ground. It is also conceivable to replace the wheels with other ground-engaging members such as tracks. The frame 2 is in the form of a gantry in order to be able to straddle a row of plants or shrubs, such as grape-vines. In known manner, the frame 2 carries a harvesting assembly 5, comprising a shaker assembly (not shown) for dislodging the grapes from the vines and two elevator conveyors 8 for collecting the detached grapes and conveying them to two storage tanks or bins 9 on both sides of the harvester 1. The frame 2 further carries an engine 11, providing the rotational power necessary to drive the various active members of the harvesting assembly 5 and the conveyors and also providing motive power to the wheels 3, 4, since the vehicle 1 is of the self-propelled type.

The harvesting assembly 5 may be fixed in a permanent manner to the main frame 2 of the machine, or else, it may be made in the form of a removable assembly which is detachably affixed to the main frame 2, so as to be capable of being replaced by other equipment or accessories, such as spraying equipment, pruning equipment, equipment for tilling the ground, etc.

The driving and harvesting functions of the vehicle are controlled by the operator from an operator's platform 13, which is attached to the front portion of the frame 2 above the left steering wheel 3. To increase the comfort of the operator, an environmentally insulated cab 14 is provided which surrounds the position of the operator on the platform 13.

The elevator conveyors 8 each form a closed loop around the shaker assembly 5 and comprise each a closed chain provided with a series of interconnected cups or buckets 16. Preferably the bottom runs 8a of the two conveyors 8 are adjacent to each other and guided on either side of the vine row so as to clamp the foot of the vines and capture the crop material detached by the shaker assembly. The vertical rear runs 8b and front runs 8d of the elevator conveyors 8 diverge upwardly and outwardly from the longitudinal axes of the bottom runs 8a to clear the passage of the upper portion of the plants into and out of the harvesting assembly 5. The velocity of the bottom runs 8a in relation to the frame 2 is equal and opposite to the velocity of the machine along the vine row, such that there is no relative movement of the bottom runs 8a to the stems of the plants which they enclose. Such arrangement precludes premature wear of the buckets 16 and damages to the vines.

When the conveyors 8 enter their upper run 8c the buckets 16 are tipped over to deposit their contents onto guide plates 18 installed on both sides of the frame 2. Each guide plate 18 (FIG. 2) is slantingly arranged to convey the dislodged crop material forwardly to the lower portion of an intermediate apron conveyor 20. The apron conveyors 20 transport the crop material outwardly and slightly upwardly to the bins 9. A longitudinally arranged divider auger (not shown) installed below the discharge end of each apron conveyor 20 assures the proper distribution of the grapes into the bins 9.

Above the discharge ends of the conveyors 20, cleaning mechanism 27 have been installed for extraction of the foliage from the crop material (FIG. 1). The cleaning mechanism 27 comprise a hood 29 directed to the discharge area of the conveyor 20 and an extractor fan 30 registering with the top of the hood 29. The fan rotor 32 can be driven at various speeds, e.g. by a hydraulic motor, for creating an upwardly directed air flow which engages the crop material as it is being conveyed on top of the apron conveyor 20 and projected into the bins 9. The trajectory of the heavier crop elements, such as loose grape berries or complete grape bunches, is substantially unaffected by the air flow, but the leaves, which have a larger surface to weight ratio, are lifted up and drawn into the fan 30. The extracted leaves are expelled by the fan 30 through a discharge duct 34 mounted over and to the front of the bin 9 and are deposited onto the field besides the grape harvester 1. By adjusting the rotational speed of the fan rotors 32, e.g. by controlling the hydraulic pump feeding the hydraulic motor of the fan, a more or less aggressive action of the fan on the crop material which is being discharged into the bins 9, can be obtained. When the leaves are dry and easily removable the rotor speed may be lowered. When the quantity of leaves in the crop material increases or when they become more adhesive, it may be required to increase the rotor speed for effective cleaning of the crop.

Figure 2:
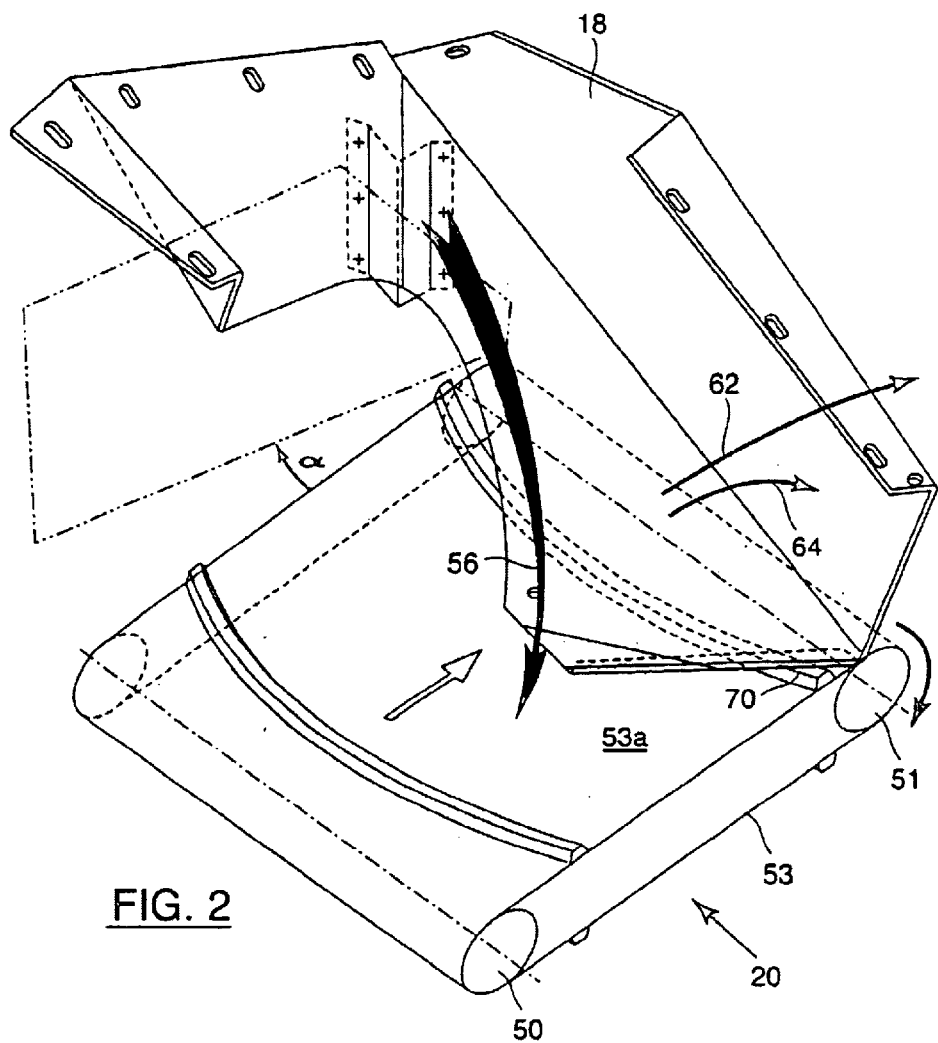
FIG. 2 is a perspective view showing the relative positions of the apron conveyor and a guide plate for guiding the crop material thereto.
Figure 4:
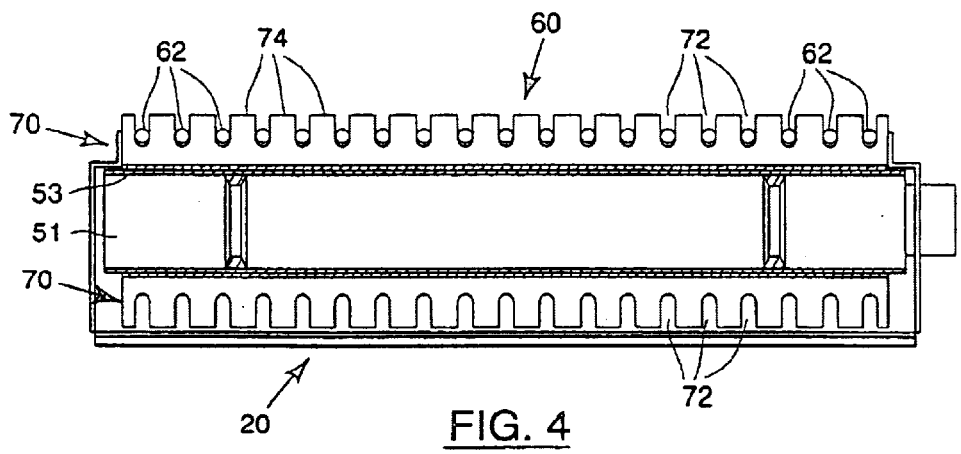
FIG. 4 is a transverse cross sectional view of the apron conveyor taken along line IV–IV in FIG. 3.
Figure 3:
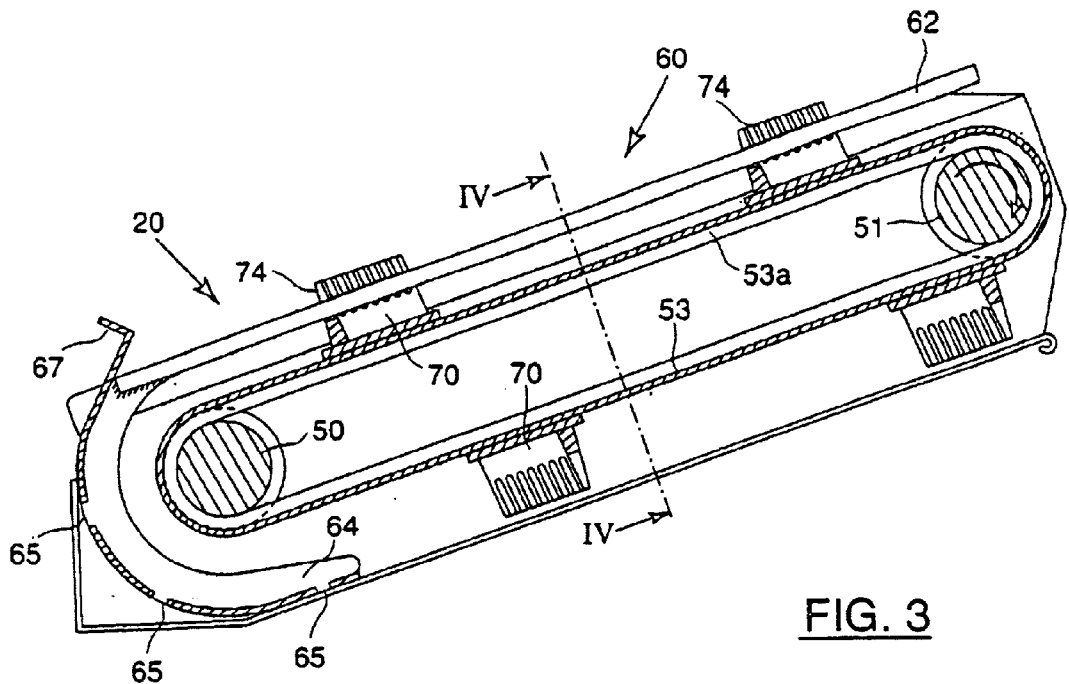
FIG. 3 is a longitudinal cross sectional view of the apron conveyor and the screen which is positioned above the upper apron run.

As illustrated in FIGS. 2 to 4, each apron conveyor 20 comprises a pair of rollers 50, 51, extending in the longitudinal direction of the harvester 1, and an apron 53 which is wrapped over the roller pair. One of the rollers 50, 51 is rotated by appropriate motor mechanism (not shown) such as a hydraulic or electrical motor. The linear speed of the apron can be varied in order to adapt to various harvesting and/or crop conditions. In an embodiment of the present invention the apron 53 is driven at a maximum linear speed of approximately 80 m/min. The outer roller 51 is installed somewhat higher than the inner roller 50, such that the upper run 53a of the apron 53 has an inclination $\alpha$ of approximately 15° to the horizontal. The guide plate 18 directs the flow of crop material discharged by the elevator conveyor 8 forwardly and somewhat inwardly as indicated by arrow 56 in FIG. 2, such that the bulk of the material is received by the apron 53 at an angle of about 30° to the transport direction of the apron conveyor 20.

The crop material gathered by the buckets 16 does not only contain loose grapes, grape bunches and leaves, but also fruit juice emerging from the grapes which are burst or bruised by the action of the shaker assembly or by their fall onto the elevator conveyor 8. When collected in the bins 9, this juice can be used for further wine-making. The juice is projected in the form of drops from the apron conveyor 20. When the crop material reaches the end of the conveyor 20, it has been experienced that, when no special precautions are taken, a substantial portion of these drops is sucked away by the fan 30 and ejected through the discharge duct 34 together with the leaves. Hence it is advantageous to remedy to these losses and to reduce the exposure of the juice to the action of the fan 30.

Figure 5:
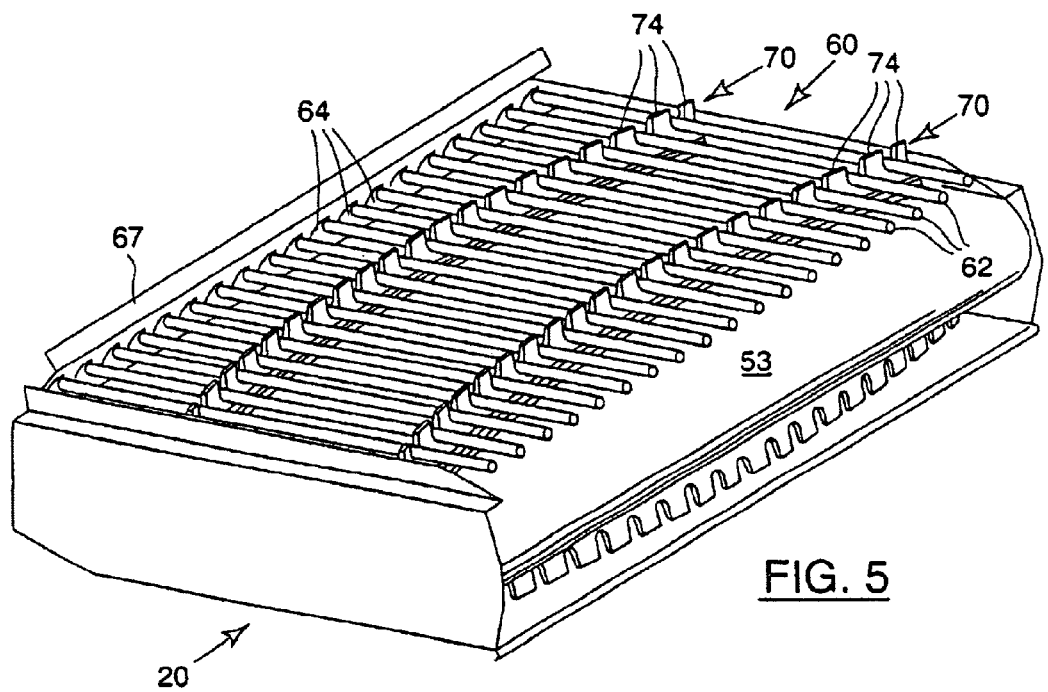
FIG. 5 is a perspective view of the conveyor and the screen of FIGS. 3 and 4.

According to a preferred embodiment of the invention the conveyor 20 is equipped with a screen 60 arranged above the upper run 53a of the apron 53, as illustrated in FIGS. 3–5. The screen 60 is constituted by a set of parallel bars 62 which extend substantially parallel to this upper run. The diameter of the bars 62 and the distance inbetween is chosen to permit the passage of single grape berries and juice and to retain materials having a larger surface, such a grape bunches and leaves. For instance the bars may have a diameter of about 10 mm and may be disposed at a mutual distance of 30 to 40 mm and at a distance of 30 to 40 mm above the surface of the apron 53. The bars 62 extend in the direction of the movement of the conveyor 20. Upstream and downstream are defined with respect to the normal direction of conveyance of the apron 53. Each bar 62 is connected, e.g. by welding, by its upstream end to a crescent-shaped bar mount 64, which is positioned in front of and below the conveyor roller 50. The bar mounts 64 are provided with a plurality of ears 65 for installing the mounts 64 parallel to each other into apertures of a curved front plate 67 of the conveyor 20. The bars 62 should be made of rigid and wear-resistant material, such as stainless steel or composite material, e.g. glass-fibre reinforced resin material.

The downstream ends of the bars 62 end short of the downstream end of the conveyor 20. The bars are cantilevered such that the material which is conveyed above and below the bars 62 can be projected outwardly into one of the bins 9.

The apron 53 is wrapped around the rollers 50, 51 and then secured in place by connecting together the end portions of the apron by appropriate mechanism such as rivets or bolts (not shown). The apron 53 may be made out of polyvinylchloride, polyurethane or any other suitable flexible material. Transverse ridges 70 have been attached, e.g. by gluing, vulcanising or by a thermal process, to the surface of the apron 53. The ridges 70 are curved to collect the fruit near the middle of the apron 53 while it is conveyed upwardly to the bin 9. They have an upper rim showing a series of indentures 72 and fingers 74 (FIG. 4). The indentures 72 accommodate the screen bars 62. The fingers 74 extend above the bars at a level sufficiently high to engage and convey the grape bunches and leaves deposited on top of the screen 60. As the apron 53 moves around the rollers 50, 51, the fingers 74 pass between the crescent portions of the bar mounts 64.

During harvesting operations, the detached crop material is deposited by the elevator conveyor 8 onto the screen 60. Loose grape berries and juice migrate between the bars 62 onto the surface of the apron 53. The berries and the juice tend to run down the inclined conveyor, but they are retained by the solid lower portions of the ridges 70. The curvature of the ridges concentrates them near the middle section of the apron. At the end of the conveyor 20 they are launched along a trajectory 64 (FIG. 2) below the fan hood 29 into the bin 9.

The leaves and the grape bunches are retained by the screen 60. The ridge fingers 74 engage this portion of the crop material and convey it downstream to the deposit zone below the fan 30. At the discharge end of the apron conveyor 20, leaves and bunches are projected along a second trajectory 62, above the trajectory 64 of the loose berries and the juice. They pass closer to the fan 30 such that the leaves are lifted up the hood 29 more easily. Meanwhile the stronger air stream has hardly any effect on the bunches which fall down into the bin 9. As most of the juice was collected below the grape bunches and the leaves, it is sheltered thereby from the direct action of the fan 30. Furthermore, the juice drops are projected at a greater distance from the fan, such that significantly less juice drops are that suck into the fan and ejected through the discharge duct 34 onto the ground next to the harvester 1.

Although the bars 62 are mounted in a cantilever way, they are still able to sustain a substantial amount of material without deflecting, as they are sustained by the bottoms of the indentures 72 in the apron ridges 70. By adapting the dimensions of the indentures to the section of the bars 62, a tight fit can be realised such that each ridge 70 acts as a scraper, removing any material which stick to the bars. Hence such system is self-cleaning.

It will be appreciated that thus is provided a simple, yet effective mechanism for separating the juice from the detached fruit and providing a distinct trajectory to the fluid and the solid crop material at the exit of a conveyor.

Although the present invention has been described with reference to a particular type of fruit harvester and conveyor assembly, it will be appreciated that other embodiments can be thought of, without departing however from the original idea of the invention. For example, the screen may be constituted by longitudinal elements having a rectangular or triangular cross section. The screen elements may be attached at both their upstream and downstream ends to the conveyor structure in order to provide for a more rigid screen. The fingers extending from the apron 53 need not to be aligned, but may be distributed over the full apron surface. It is also conceivable to replace the apron conveyor with another type of conveyor, for instance a bucket conveyor, and to provide the conveying elements, for instance the buckets, with elements extending through the screen for transporting the crop material which is deposited onto the screen, while the juice is received on or in the conveying elements below the screen. It is also conceivable that the conveyor does not deposit the fruit directly into the container, but that further conveyor mechanism are provided for receiving the cleaned fruit and transporting it to the container.

It will be understood that changes in the details, materials, steps and arrangements of parts that have been described and illustrated to explain the nature of the invention will occur to and may be made by those skilled in the art upon reading of this disclosure within the principles and scope of the invention. The foregoing description illustrates the preferred embodiment of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A fruit harvesting machine, comprising:
   a wheel-supported frame adapted for movement through a field;
   a harvesting assembly detaching crop material, comprising fruit and foliage, standing on said field;

a conveyor mechanism receiving said detached fruit and foliage, together with juice from said fruit, and transporting the same either directly or indirectly toward a container receiving the fruit and juice;

a screen mechanism retaining thereon solid fruit portions and for allowing passage therethrough of said juice; and a cleaning mechanism installed above said conveyor mechanism, said cleaning mechanism separating said foliage from said detached fruit;

characterised in that:

said screen mechanism is positioned at a fixed location above said conveyor mechanism and below said cleaning mechanism; and said conveyor mechanism is provided with a tine mechanism extending through said screen mechanism for engaging and moving said solid fruit portions toward said container.

2. A fruit harvesting machine according to claim 1, further characterised in that: said conveyor mechanism comprises a conveyor apron and said tine mechanism comprise an array of outwardly extending fingers affixed to said apron and extending outwardly through said screen mechanism.

3. A fruit harvesting machine according to claim 2, further characterised in that said fingers extend from substantially transverse ridges having a solid base portion which is operable to retain said juice.

4. A fruit harvesting machine according to claim 2, wherein said apron includes an upper crop receiving run that is inclined upwardly along a conveying direction toward said container.

5. A fruit harvesting machine according to claim 3, wherein said apron is inclined upwardly along a conveying direction toward said container.

6. A fruit harvesting machine according to claim 4, further characterised in that said upper crop receiving run is inclined at an angle of substantially 15 degrees with respect to a horizontal plane.

7. A fruit harvesting machine according to claim 5, further characterised in that said upper crop receiving run is inclined at an angle of substantially 15 degrees with respect to a horizontal plane.

8. A fruit harvesting machine according to claim 4, further characterised in that said fingers extend from substantially transverse ridges having a solid base portion which is operable to retain said juice, wherein said ridges are curved in shape and have a lowest point near a middle of said apron.

9. A fruit harvesting machine according to claim 5, further characterised in that said ridges are curved in shape and have a lowest point near a middle of said apron.

10. A fruit harvesting machine according to claim 6, further characterised in that said fingers extend from substantially transverse ridges having a solid base portion which is operable to retain said juice, wherein said ridges are curved in shape and have a lowest point near the a middle of said apron.

11. A fruit harvesting machine according to claim 4, further characterised in that said screen mechanism extends substantially parallel to said conveyor mechanism.

12. A fruit harvesting machine according to claim 5, further characterised in that said screen mechanism extends substantially parallel to said conveyor mechanism.

13. A fruit harvesting machine according to claim 6, further characterised in that said screen mechanism extends substantially parallel to said conveyor mechanism.

14. A fruit harvesting machine according to claim 7, further characterised in that said screen mechanism extends substantially parallel to said conveyor mechanism.

15. A fruit harvesting machine according to claim 8, further characterised in that said screen mechanism extends substantially parallel to said conveyor mechanism.

16. A fruit harvesting machine according to claim 9, further characterised in that said screen mechanism extends substantially parallel to said conveyor mechanism.

17. A fruit harvesting machine according to claim 10, further characterised in that said screen mechanism extends substantially parallel to said conveyor mechanism.

18. A fruit harvesting machine according to claim 4, further characterised in that said screen mechanism comprises an array of bars extending above said conveyor mechanism.

19. A fruit harvesting machine according to claim 6, further characterised in that said screen mechanism comprises an array of bars extending above said conveyor mechanism.

20. A fruit harvesting machine according to claim 8, further characterised in that said screen mechanism comprises an array of bars extending above said conveyor mechanism.

21. A fruit harvesting machine according to claim 11, further characterised in that said screen mechanism comprises an array of bars extending above said conveyor mechanism.

22. A fruit harvesting machine according to claim 17, further characterised in that said screen mechanism comprises an array of bars extending above said conveyor mechanism.

23. A fruit harvesting machine according to claim 18, further characterised in that said bars extend parallel to each other along the conveying direction.

24. A fruit harvesting machine according to claim 18, further characterised in that said tine mechanism contacts said bars for scraping material off said bars while said conveyor mechanism transports crop material to said container.

25. A fruit harvesting machine according to claim 23, further characterised in that said fingers extend from substantially transverse ridges having a solid base portion which is operable to retain said juice, wherein said solid base portion is operable to sustain said bars.

26. A fruit harvesting machine according to claim 24, further characterised in that said fingers extend from substantially transverse ridges having a solid base portion which is operable to retain said juice, wherein said solid base portion is operable to sustain said bars.

27. A harvesting machine according to claim 18, further characterised in that said bars are mounted in a cantilever fashion having free ends disposed adjacent a downstream end of said conveyor mechanism.

28. A harvesting machine according to claim 23, further characterised in that said bars are mounted in a cantilever fashion having free ends disposed adjacent a downstream end of said conveyor mechanism.

29. A harvesting machine according to claim 24, further characterised in that said bars are mounted in a cantilever fashion having free ends disposed adjacent a downstream end of said conveyor mechanism.

30. A fruit harvesting machine according to claim 27, further characterised in that each bar is connected to a separate bar mount adjacent an upstream end of said conveyor mechanism, said tine mechanism being operable to pass between said bar mounts.

31. A fruit harvesting machine according to claim 30, further characterised in that said bar mounts are detachably affixed to a mounting plate.

32. A fruit harvesting machine according to claim 18, further characterised in that said bars are made out of corrosion resistant material.

33. A fruit harvesting machine according to claim 27, further characterised in that said bars are made out of corrosion resistant material.

34. A fruit harvesting machine according to claim 30, further characterised in that said bars are made out of corrosion resistant material.

35. A fruit harvesting machine according to claim 31, further characterised in that said bars are made out of corrosion resistant material.

36. A fruit harvesting machine according to claim 32, further characterised in that said corrosion resistant material is selected from the group consisting of stainless steel and composite material.

37. A fruit harvesting machine according to claim 2, further characterised in that said cleaning mechanism is installed adjacent a discharge end of said conveyor mechanism.

38. A fruit harvesting machine according to claim 3, further characterised in that said cleaning mechanism is installed adjacent a discharge end of said conveyor mechanism.

39. A fruit harvesting machine according to claim 4, further characterised in that said cleaning mechanism is installed adjacent a discharge end of said conveyor mechanism.

40. A fruit harvesting machine according to claim 6, further characterised in that said cleaning mechanism is installed adjacent a discharge end of said conveyor mechanism.

41. A fruit harvesting machine according to claim 8, further characterised in that said cleaning mechanism is installed adjacent a discharge end of said conveyor mechanism.

42. A fruit harvesting machine according to claim 11, further characterised in that said cleaning mechanism is installed adjacent a discharge end of said conveyor mechanism.

43. A fruit harvesting machine according to claim 18, further characterised in that said cleaning mechanism is installed adjacent a discharge end of said conveyor mechanism.

44. A fruit harvesting machine according to claim 23, further characterised in that said cleaning mechanism is installed adjacent a discharge end of said conveyor mechanism.

45. A fruit harvesting machine according to claim 25, further characterised in that said cleaning mechanism is installed adjacent a discharge end of said conveyor mechanism.

46. A fruit harvesting machine according to claim 27, further characterised in that said cleaning mechanism is installed adjacent a discharge end of said conveyor mechanism.

47. A fruit harvesting machine according to claim 28, further characterised in that said cleaning mechanism is installed adjacent a discharge end of said conveyor mechanism.

48. A fruit harvesting machine according to claim 37, further characterised in that said cleaning mechanism comprises a hood having an inlet installed over said discharge end and an outlet registering with a fan for drawing said foliage into said inlet.

49. A fruit harvesting machine according to claim 2, further characterised in that said conveyor mechanism and said cleaning mechanism each have an adjustable operating speed.

50. A fruit harvesting machine according to claim 37, further characterised in that said conveyor mechanism and said cleaning mechanism each have an adjustable operating speed.

51. A fruit harvesting machine according to claim 2, further characterised in that:
said screen mechanism comprises an array of retaining elements disposed at a mutual distance which is sufficient for allowing the passage of loose berries; and
said conveyor mechanism is adapted for receiving said loose berries and conveying them below said screen mechanism to said container.

52. A fruit harvesting machine according to claim 6, further characterised in that:
said screen mechanism comprises an array of retaining elements disposed at a mutual distance which is sufficient for allowing the passage of loose berries; and
said conveyor mechanism is adapted for receiving said loose berries and conveying them below said screen mechanism to said container.

53. A fruit harvesting machine according to claim 8, further characterised in that:
said screen mechanism comprises an array of retaining elements disposed at a mutual distance which is sufficient for allowing the passage of loose berries; and
said conveyor mechanism is adapted for receiving said loose berries and conveying them below said screen mechanism to said container.

54. A fruit harvesting machine according to claim 11, further characterised in that:
said screen mechanism comprises an array of retaining elements disposed at a mutual distance which is sufficient for allowing the passage of loose berries; and
said conveyor mechanism is adapted for receiving said loose berries and conveying them below said screen mechanism to said container.

55. A fruit harvesting machine according to claim 27, further characterised in that:
said screen mechanism comprises an array of retaining elements disposed at a mutual distance which is sufficient for allowing the passage of loose berries; and
said conveyor mechanism is adapted for receiving said loose berries and conveying them below said screen mechanism to said container.

56. A fruit harvesting machine according to claim 30, further characterised in that:
said screen mechanism comprises an array of retaining elements disposed at a mutual distance which is sufficient for allowing the passage of loose berries; and
said conveyor mechanism is adapted for receiving said loose berries and conveying them below said screen mechanism to said container.

57. A fruit harvesting machine according to claim 37, further characterised in that:
said screen mechanism comprises an array of retaining elements disposed at a mutual distance which is sufficient for allowing the passage of loose berries; and
said conveyor mechanism is adapted for receiving said loose berries and conveying them below said screen mechanism to said container.

58. A method for transporting a gathered crop material, including fruit and foliage, from a field in a fruit harvesting machine of the type including a wheel-supported frame adapted for movement through a field, the method comprising the steps of:

(A) receiving detached fruit and foliage along with juice from said fruit;

(B) transporting the detached fruit, foliage, and juice toward a container;

(C) retaining solid fruit portions on a screen while passing said juice through the screen and onto a conveyor transporting the juice toward the container;

(D) separating said foliage from said detached fruit;

(E) engaging and moving said solid fruit portions toward said container with at least one tine extending through said screen.

59. The method as recited in claim 58, further comprising the step of transporting the detached fruit and foliage in a direction parallel to a direction that said juice is transported.

60. The method as recited in claim 58, further comprising scraping material off said screen with said tines during step (B).

61. The method as recited in claim 58, wherein step (D) is performed adjacent a discharge end of said conveyor.

62. The method as recited in claim 58, wherein step (D) further comprises inducing a forced air drawing said foliage into a hood directing the foliage away from the container.

63. The method as recited in claim 58, wherein step (C) further comprises transporting the juice on the conveyor to the container.

64. A fruit harvesting machine, comprising:

a wheel-supported frame adapted for movement through a field;

a harvesting assembly detaching crop material, comprising fruit and foliage, standing on said field;

a screen receiving said detached fruit and foliage, together with juice from said fruit, and transporting the same either directly or indirectly toward a container receiving the fruit and juice, the screen being configured to permit said juice to pass therethrough;

a conveyor receiving said juice that has passed through the screen; and an array of fingers connected to said conveyor and extending outwardly through said screen mechanism; and a fan disposed above said screen mechanism, said fan producing an air flow that separates said foliage from said detached fruit.

65. The fruit harvesting machine as recited in claim 64, further comprising a hood having an inlet installed over said discharge end and an outlet registering with the fan for drawing said foliage into said inlet and directing the foliage away from the container.

66. The fruit harvesting machine as recited in claim 64, wherein said fingers extend from substantially transverse ridges having a solid base portion operable to retain said juice.

67. The fruit harvesting machine as recited in claim 64, wherein said apron is inclined upwardly along a conveying direction toward said conveyor.

68. The fruit harvesting machine as recited in claim 64, wherein said screen is further configured to permit loose berries to pass therethrough onto said conveyor.

* * * * *